United States Patent
Jang et al.

(10) Patent No.: US 8,295,900 B2
(45) Date of Patent: Oct. 23, 2012

(54) TERMINAL APPARATUS WITH BUILT-IN FAULT CURRENT LIMITER FOR SUPERCONDUCTING CABLE SYSTEM

(75) Inventors: Hyun Man Jang, Suwon-si (KR); Su Kil Lee, Gumi-si (KR); Choon Dong Kim, Gunpo-si (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 351 days.

(21) Appl. No.: 12/812,833

(22) PCT Filed: Jan. 5, 2009

(86) PCT No.: PCT/KR2009/000019
§ 371 (c)(1),
(2), (4) Date: Jul. 14, 2010

(87) PCT Pub. No.: WO2009/093819
PCT Pub. Date: Jul. 30, 2009

(65) Prior Publication Data
US 2011/0045987 A1    Feb. 24, 2011

(30) Foreign Application Priority Data
Jan. 25, 2008  (KR) ................ 10-2008-0007873

(51) Int. Cl.
*H01F 6/06* (2006.01)
*H01L 23/48* (2006.01)
(52) U.S. Cl. ...................... 505/163; 505/190
(58) Field of Classification Search .......... 505/163, 505/190, 230
See application file for complete search history.

(56) References Cited

U.S. PATENT DOCUMENTS

| 4,994,932 | A | 2/1991 | Okamoto et al. |
| 8,117,861 | B2 * | 2/2012 | Husband et al. ............. 62/259.2 |
| 2005/0204751 | A1 * | 9/2005 | White et al. .................. 62/51.1 |
| 2008/0119362 | A1 | 5/2008 | Ashibe et al. |
| 2010/0099571 | A1 * | 4/2010 | Usoskin .......................... 505/230 |
| 2012/0115733 | A1 * | 5/2012 | Husband et al. .............. 505/220 |

FOREIGN PATENT DOCUMENTS

| JP | 2007-266508 | 10/2007 |
| KR | 10-0508710 | 8/2005 |
| KR | 10-0590200 | 6/2006 |
| KR | 10-0642538 | 10/2006 |

(Continued)

*Primary Examiner* — Colleen Dunn
(74) *Attorney, Agent, or Firm* — Sherr & Jiang, PLLC

(57) ABSTRACT

A terminal apparatus for a superconducting cable system connects an overhead transmission cable or power appliance such as a breaker in an ambient temperature state to a superconducting cable through which power is transmitted at a cryogenic temperature. The terminal apparatus has: a refrigerant tub which is connected to the end of a superconducting cable and is filled with a refrigerant; a vacuum heat insulating container that surrounds the exterior of the refrigerant tub; a current lead having one end connected to the end portion of the superconducting cable and the other end connected to the overhead transmission cable or power appliance through the refrigerant tub and the vacuum heat insulating container; and a superconducting fault current limiter installed at a center portion of the current lead in the interior of the refrigerant tub to limit fault current. As the superconducting fault current limiter is built in the terminal apparatus, the terminal apparatus itself can play the role of a fault current limiter too. Hence, the terminal apparatus can protect a superconducting cable from a fault current directly by limiting the fault current flowed into the superconducting cable when a power transmission fault occurs.

3 Claims, 3 Drawing Sheets

FOREIGN PATENT DOCUMENTS

| | | |
|---|---|---|
| KR | 10-2007-0003879 | 1/2007 |
| KR | 10-2007-0094775 | 9/2007 |
| WO | WO2005/072622 | 8/2005 |
| WO | WO2006075443 | 7/2006 |

\* cited by examiner

[Figure 1]
PRIOR ART
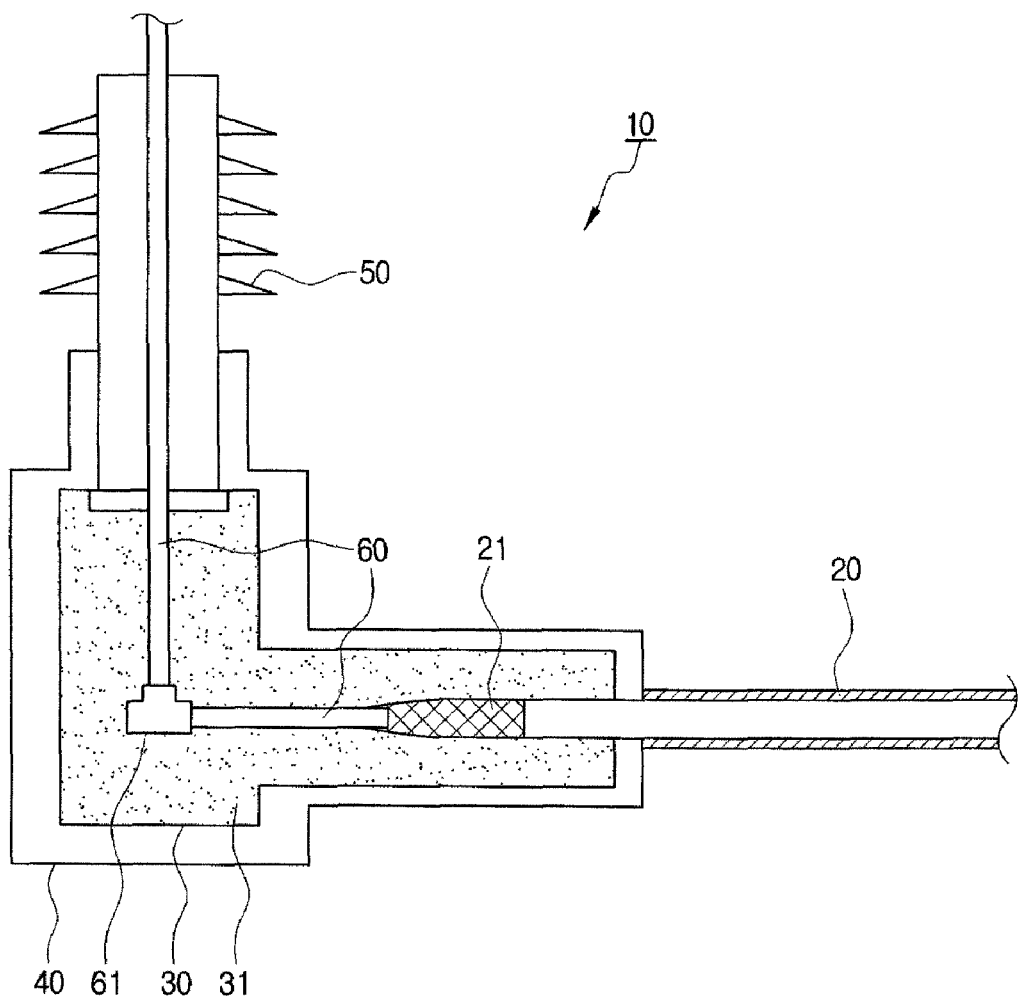

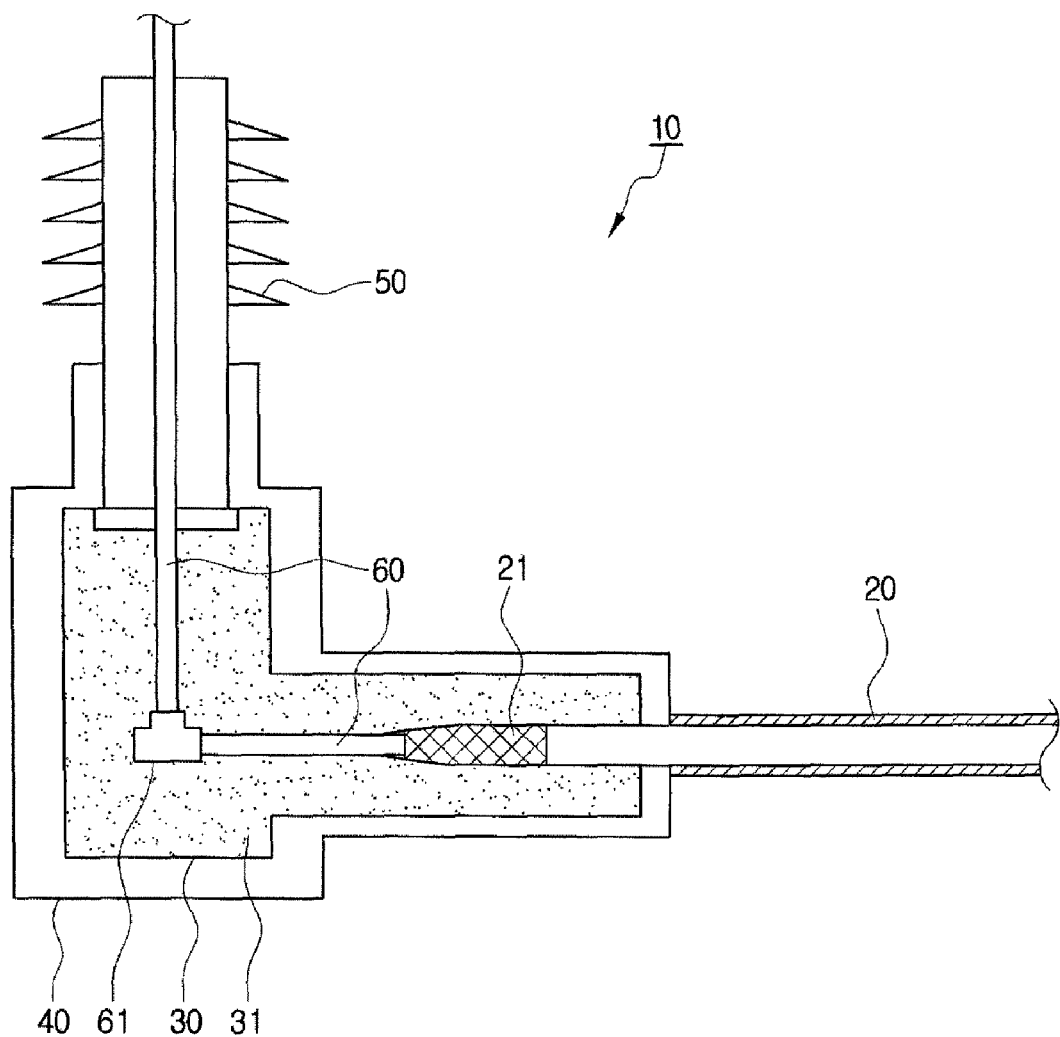
[Figure 2]

[Figure 3]
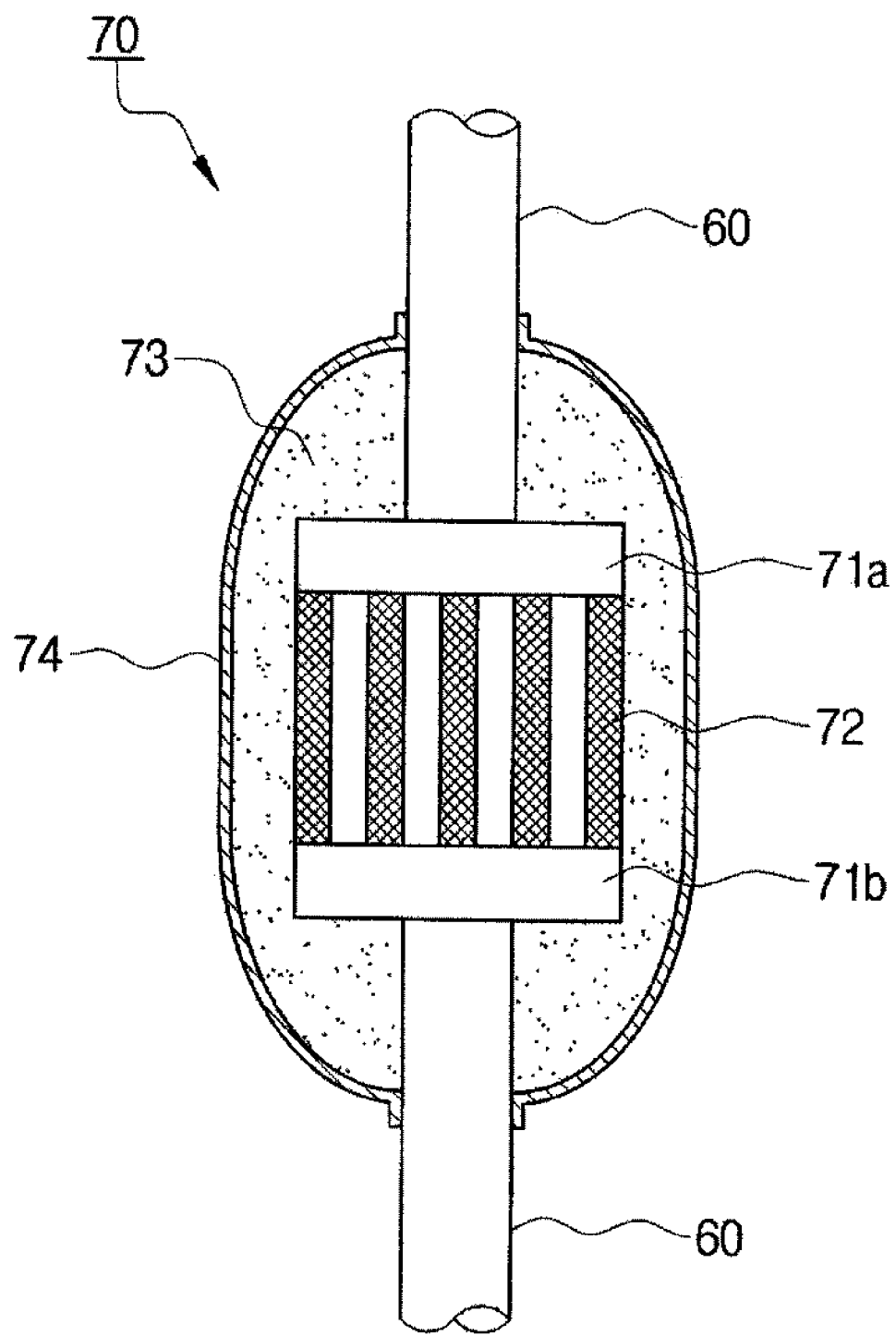

TERMINAL APPARATUS WITH BUILT-IN FAULT CURRENT LIMITER FOR SUPERCONDUCTING CABLE SYSTEM

CROSS REFERENCE TO PRIOR APPLICATIONS

This application is a National Stage Patent Application of International Patent Application No. PCT/KR2009/000019 (filed on Jan. 5, 2009) under 35 U.S.C. 371, which claims priority to Korean Patent Application No. 10-2008-0007873 (filed on Jan. 25, 2008), which are both hereby incorporated by reference in their entirety.

TECHNICAL FIELD

Disclosed herein is a terminal apparatus for a superconducting cable system. More particularly, disclosed herein is a terminal apparatus with a built-in fault current limiter for a superconducting cable system, in which a superconducting fault current limiter (SFCL) is built in the terminal apparatus so that the terminal apparatus itself can also play the role of a fault current limiter.

BACKGROUND ART

A terminal apparatus for a superconducting cable system is an apparatus that connects a superconducting cable and a normal conducting cable to each other, i.e., a connecting apparatus for connecting a superconducting cable through which power is transmitted at a cryogenic temperature to an overhead transmission cable or power appliance such as a circuit breaker in an ambient temperature state.

Such a terminal apparatus for a superconducting cable system has been disclosed in Korean Patent No. 10-0508710, Korean Patent No. 10-0590200, Korean Patent No. 10-0642538, and Korean Patent Application Publication No. 10-2007-0003879.

FIG. 1 illustrates a schematic view of a related art terminal apparatus for a superconducting cable system, disclosed in the aforementioned patents and the like. As illustrated in FIG. 1, the terminal apparatus 10 for the superconductor cable system includes a refrigerant tub 30 filled in the interior thereof with a refrigerant 31 such as liquid nitrogen while being connected to an end portion of a superconducting cable 20, a vacuum heat insulating container 40 that surrounds the exterior of the refrigerant tub 30, a nonconductor 50 made of a porcelain tube (insulator) or the like, disposed at an ambient temperature side of the vacuum heat insulating container 40, and a current lead 60 having one end connected to the end portion of the superconducting cable 20 through a conductor connecting portion 21 and the other end extended to the interior of the nonconductor 50 by passing through the refrigerant tub 30 and the vacuum heat insulating container 40 so as to be connected to an overhead transmission cable or power appliance.

In the related art terminal apparatus 10 for the superconducting cable system, a general metal such as copper or aluminum is used as the current lead 60. However, since electrical resistance is constant regardless of current in the general metal such as copper or aluminum, transient fault current flows into the superconducting cable 20 or external power appliance through the current lead 60 as it is, when a power transmission fault occurs. Therefore, the superconducting cable 20 or external power appliance may be damaged.

When the fault occurs, the temperature of an extremely lower temperature refrigerant (liquid nitrogen or the like) is increased by the heat generation of the current lead 60 due to the fault current. In this case, the heat generation may be limited to some degree by increasing the sectional area of the current lead 60. However, an amount of heat (ambient temperature) is further conducted as much as the increased sectional area from an ambient temperature side (upper portion of the nonconductor 50 in FIG. 1) to a cryogenic temperature side (refrigerant side), and therefore, the temperature of the refrigerant may be increased.

Meanwhile, as power systems are complicated due to the increase of power demand, fault current caused by faults of the power systems is gradually increased, and accordingly, a large-scale circuit breaker is required. If a superconducting fault current limiter (SFCL) is applied corresponding to the circuit breaker, the SFCL can function to protect the power systems, e.g., to decrease the capacity of the circuit breaker by reducing the amplitude of the fault current, and the like.

However, since the related art SFCL is established separately from the terminal apparatus for the superconducting cable system, it is quenched due to the occurrence of a power transmission fault in a power system, and excessive heat is generated when fault current is limited. Accordingly, the temperature of an internal refrigerant is excessively increased, and the refrigerant may be vaporized. For example, if a power transmission fault occurs in a power system when an SFCL is used, an operation is performed through a sequence of the occurrence of a power transmission fault, the limitation of fault current in the SFCL, the operation of a circuit breaker (limitation of power) and the reoperation of the circuit breaker (reconnection of power). Therefore, the SFCL is necessarily restored to a normal state before the reoperation of the circuit breaker. To this end, it is necessarily required to use a large-scale cooling apparatus (refrigerant apparatus) capable of absorbing the amount of heat generated by limiting the fault current. Further, it is necessary to protect against a pressure fault caused by the volume expansion of a refrigerant such liquid nitrogen. Furthermore, since the related art SFCL is provided only to protect the power system, it is necessary to add a protecting function in the design of a superconducting cable system.

DISCLOSURE

Technical Problem

Disclosed herein is a terminal apparatus for a superconducting cable system, in which a superconducting fault current limiter (SFCL) is built in the terminal apparatus itself so that the terminal apparatus can also play the role of a fault current limiter, thereby directly protecting a superconducting cable in the occurrence of a power transmission fault in a power system, reducing the capacity of a circuit breaker connected to an end of the superconducting cable, maximizing the safety of the power system by limiting fault current even when a ground or short-circuit fault occurs in the interior of the superconducting cable, and operating the SFCL with only the capacity of a cooling system for the superconducting cable without adding a separate cooling system.

Technical Solution

In an aspect, there is provided a terminal apparatus for connecting a superconducting cable through which power is transmitted at a cryogenic temperature to an overhead power cable or power appliance in an ambient temperature state, the terminal apparatus including: a refrigerant tub connected to an end portion the superconducting cable, the refrigerant tub having a refrigerant filled in the interior thereof; a vacuum heat insulating container that surrounds the exterior of the refrigerant tub; a current lead having one end connected to the end portion of the superconducting cable and the other end connected to the overhead power cable or power appliance by passing through the refrigerant tub and the vacuum heat insulating container; and a superconducting fault current limiter installed at a center portion of the current lead in the interior of the refrigerant tub to limit fault current.

The superconducting fault current limiter may include a pair of connecting portions each connected to the current lead; a superconducting fault current limiting element through which the pair of connecting portions are connected to each other; and a shield cover for electric and magnetic field reduction, which surrounds the connecting portions and the superconducting fault current limiting element, the shield cover having a refrigerant filled in the interior thereof.

The shield cover and the refrigerant tub may be connected so that their refrigerants are communicated with each other.

Advantageous Effects

In a terminal apparatus for a superconducting cable system disclosed herein, a superconducting fault current limiter (SFCL) is built in the terminal apparatus itself so that the terminal apparatus can also play the role of a fault current limiter, thereby directly protecting a superconducting cable by limiting fault current flowed into the superconducting cable in the occurrence of a power transmission fault in a power system. Accordingly, it is easy to design a protection circuit of the superconducting cable, and it is possible to compact the superconducting cable.

Also, the terminal apparatus plays the role of the fault current limiter, so that the capacity of a circuit breaker connected to an end of the superconducting cable can be reduced, and fault current can be limited by the built-in SFCL even when a ground or short-circuit fault occurs in the interior of the superconducting cable. Accordingly, the safety of the power system can be maximized.

Also, it is possible to design the SFCL with only the capacity of a cooling system for the superconducting cable without adding a separate cooling system.

DESCRIPTION OF DRAWINGS

The above and other objects, features and advantages disclosed herein will become apparent from the following description of particular embodiments given in conjunction with the accompanying drawings.

FIG. 1 is a schematic view of a related art terminal apparatus for a superconducting cable system.

FIG. 2 is a view of a terminal apparatus for a superconducting cable system according to an embodiment.

FIG. 3 is a schematic view of a superconducting fault current limiter built in the terminal apparatus of FIG. 2.

BEST MODE

Exemplary embodiments now will be described more fully hereinafter with reference to the accompanying drawings, in which exemplary embodiments are shown.

FIG. 2 illustrates a terminal apparatus for a superconducting cable system according to an embodiment. In FIG. 2, components identical to those of FIG. 1 will be designated by like reference numerals. As illustrated in FIG. 2, the terminal apparatus 100 for the superconducting cable system according to the embodiment has a superconducting fault current limiter (SFCL) built therein.

Specifically, the terminal apparatus 100 for the superconducting cable system according to the embodiment includes a refrigerant tub 30 filled in the interior thereof with a refrigerant 31 while being connected to an end portion of a superconducting cable 20; a vacuum heat insulating container 40 that surrounds the exterior of the refrigerant tub 30; a nonconductor 50 disposed at an ambient temperature side of the vacuum heat insulating container 40; a current lead 60 having one end connected to the end portion of the superconducting cable 20 and the other end extended to the interior of the nonconductor 50 by passing through the refrigerant tub 30 and the vacuum heat insulating container 40 so as to be connected to an overhead transmission cable or power appliance; and a superconducting fault current limiter 70 installed at a center portion of the current lead 50 in the interior of the refrigerant tub 30 to limit fault current.

Here, the end portion of the superconducting cable 20 and the current lead 60 may be connected to each other through a conductor connecting portion 21. The current lead 60 is divided into two portions, i.e., a portion connected to the superconducting cable 20 and a portion extended to the interior of the nonconductor 50. The two portions are connected to each other by a connecting portion 61 while making at a right angle. The SFCL 70 is installed at a portion of the current lead 60 extended to the interior of the nonconductor 50.

The refrigerant 31 filled in the interior of the refrigerant tub 30 may be liquid nitrogen, but is not necessarily limited thereto.

FIG. 3 is a schematic view of the SFCL 70 built in the terminal apparatus 100. As illustrated in FIG. 3, the SFCL 70 includes two connecting portions 71a and 71b each connected to the current lead 60; a superconducting fault current limiting element 72 that connects the two connecting portions 71a and 71b to each other therethrough; and a shield cover 74 for electric and magnetic field reduction, having a refrigerant 73 filled in the interior thereof while surrounding the connecting portions 71a and 71b and the superconducting fault current limiting element 72.

As described above, the SFCL 70 is installed in the refrigerant tub 30. Therefore, if the interiors of the SFCL 70 and the refrigerant tub 30 are connected to communicate with each other, the same refrigerant can be used as the refrigerant 73 filled in the SFCL 70 and the refrigerant 31 filled in the refrigerant tub 30. Accordingly, a cooling system for the superconducting cable 20 can be used as a cooling system for the SFCL 70 as it is. Although not specifically illustrate in FIG. 3, the communication of the refrigerant between the refrigerant tub 30 and the shield cover 70 may, for example, be achieved by respectively forming holes or passages (not shown) at upper and lower portions of the shield cover 74.

For example, in a power system, current of a few KA is flowed into a power cable in ordinary times, but current of a few tens of KA is flowed into the power cable in a short time when a ground or short-circuit fault occurs. At this time, the power line made of a general metal such as copper or aluminum has a constant electrical resistance regardless of current. Hence, in the related art terminal apparatus 10 in which only a metal such as copper or aluminum is used as the current lead 60, transient fault current is flowed into the superconducting cable 20 or the external power appliance in the occurrence of a power transmission fault.

However, when the SFCL 70 is applied to the current lead 60 of the terminal apparatus 100 according to the embodiment, on current-voltage characteristics, the resistance of the SFCL 70 becomes '0 (±)' in ordinary times, so that power transmission is performed without power loss. When a power transmission fault occurs, the resistance of the SFCL 70 becomes in the state of R>>0 to limit fault current, thereby protecting the superconducting cable 20. This state is referred to as a quench state of the superconducting fault current limiting element 72, and the electrical resistance in the quench state is increased by more than several ten times than that of the metal. Sequentially, after the fault is restored, the superconducting fault current limiting element 72 of the SFCL 70 restores a superconducting state and transmits power identically to the ordinary times.

When the SFCL is established separately from the terminal apparatus as described in the related art, it is necessarily restored to a normal state before the reoperation of the circuit breaker after the operation of the circuit breaker. Therefore, it is required to use a large-scale cooling apparatus capable of absorbing the amount of heat generated by limiting the fault current. However, when the SFCL 70 is built in the terminal apparatus 100 as described in the embodiment, the cooling system of the terminal apparatus 100 can be used as the SFCL 70 as it is. Accordingly, in a normal state, it is unnecessary to increase the capacity of the cooling system. In the occurrence of a power transmission fault, the amount of heat generated from the superconducting fault current limiting element 72 is distributed to the entire superconducting cable 20 with a length of a few hundreds of meters to a few kilometers, so that the temperature of the superconducting cable 20 is not excessively increased. When the SFCL is established separately from the terminal apparatus as described in the related art, the SFCL and its cooling system (the typical cooling capacity is approximately 1 kW) are separately provided in addition to the superconducting cable and its cooling system (the cooling capacity is approximately a few kW). However, in the embodiment, it is possible to operate the SFCL with only the capacity of the cooling system of the superconducting cable.

Since the related art SFCL is used to protect the power system, an additional appliance for protecting the superconducting cable is necessarily established in the design of a superconducting cable system. However, in the embodiment, the SFCL 70 built in the terminal apparatus 100 is substituted for the additional appliance. Hence, when a power transmission fault occurs in the power system, fault current flowed into the superconducting cable 20 is limited by the SFCL 70, thereby directly protecting the superconducting cable 20. Accordingly, it is easy to design the superconducting cable system, and it is possible to compact the superconducting cable system.

Although the preferred embodiments disclosed herein have been disclosed for illustrative purposes, those skilled in the art will appreciate that various modifications, additions and substitutions are possible, without departing from the scope and spirit of the disclosure as disclosed in the accompanying claims.

INDUSTRIAL APPLICABILITY

The disclosure can be applied to a power transmission system using a superconducting cable system.

The invention claimed is:

1. A terminal apparatus for connecting a superconducting cable through which power is transmitted at a cryogenic temperature to an overhead power cable or power appliance in an ambient temperature state, the terminal apparatus comprising:
 a refrigerant tub connected to an end portion the superconducting cable, the refrigerant tub having a refrigerant filled in the interior thereof;
 a vacuum heat insulating container that surrounds the exterior of the refrigerant tub;
 a current lead having one end connected to the end portion of the superconducting cable and the other end connected to the overhead power cable or power appliance by passing through the refrigerant tub and the vacuum heat insulating container; and
 a superconducting fault current limiter installed at a center portion of the current lead in the interior of the refrigerant tub to limit fault current.

2. The terminal apparatus according to claim 1, wherein the superconducting fault current limiter comprises:
 a pair of connecting portions each connected to the current lead;
 a superconducting fault current limiting element through which the pair of connecting portions are connected to each other; and
 a shield cover for electric and magnetic field reduction, which surrounds the connecting portions and the superconducting fault current limiting element, the shield cover having a refrigerant filled in the interior thereof.

3. The terminal apparatus according to claim 2, wherein the shield cover and the refrigerant tub are connected so that their refrigerants are communicated with each other.

\* \* \* \* \*